United States Patent
Lee et al.

(10) Patent No.: US 10,499,135 B2
(45) Date of Patent: Dec. 3, 2019

(54) WIRELESS HEADPHONE HAVING BUILT-IN FLEXIBLE BATTERY

(71) Applicant: AMOGREENTECH CO., LTD., Gimpo-si (KR)

(72) Inventors: Gi Wook Lee, Yongin-si (KR); Won-San Na, Seoul (KR); Jin Pyo Park, Seoul (KR); Jun Ho Park, Seoul (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 0 days.

(21) Appl. No.: 15/742,522

(22) PCT Filed: Jul. 6, 2016

(86) PCT No.: PCT/KR2016/007337
§ 371 (c)(1),
(2) Date: Jan. 8, 2018

(87) PCT Pub. No.: WO2017/007243
PCT Pub. Date: Jan. 12, 2017

(65) Prior Publication Data
US 2018/0206023 A1 Jul. 19, 2018

(30) Foreign Application Priority Data
Jul. 7, 2015 (KR) ........................ 10-2015-0096853

(51) Int. Cl.
*H04R 1/10* (2006.01)
*H01M 2/02* (2006.01)
*H04R 5/033* (2006.01)

(52) U.S. Cl.
CPC ......... *H04R 1/1041* (2013.01); *H04R 1/1025* (2013.01); *H01M 2/0275* (2013.01);
(Continued)

(58) Field of Classification Search
CPC ...... H04R 5/0335; H04R 1/10; H04R 1/1041; H04R 1/1008; H04R 1/1025; H04R 2420/07; H01M 2/0275
See application file for complete search history.

(56) References Cited

U.S. PATENT DOCUMENTS 5,695,885 A * 12/1997 Malhi ..................... H01M 2/10
429/123
2008/0152160 A1* 6/2008 Chew .................... H04H 20/61
381/71.6

(Continued)

FOREIGN PATENT DOCUMENTS

| CN | 102959760 A | 3/2013 |
| CN | 104011814 A | 8/2014 |

(Continued)

*Primary Examiner* — Davetta W Goins
*Assistant Examiner* — Kuassi A Ganmavo
(74) *Attorney, Agent, or Firm* — Gokalp Bayramoglu

(57) ABSTRACT

A wireless headphone having a built-in flexible battery embedded therein. The wireless headphone having a built-in flexible battery includes a band part; a pair of headset parts including speaker units configured to receive a wirelessly transmitted audio signal and output the audio signal to the outside and connected to the band part; and a flexible battery embedded in the band part to supply power to the headset parts.

15 Claims, 14 Drawing Sheets

(52) U.S. Cl.
CPC ............... *H04R 1/10* (2013.01); *H04R 1/105* (2013.01); *H04R 1/1008* (2013.01); *H04R 5/0335* (2013.01); *H04R 2420/07* (2013.01)

(56) References Cited

U.S. PATENT DOCUMENTS

| | | | | |
|---|---|---|---|---|
| 2011/0062796 | A1* | 3/2011 | Farahani | H01Q 1/248 |
| | | | | 307/154 |
| 2012/0135299 | A1* | 5/2012 | Kwon | H01M 2/0202 |
| | | | | 429/164 |
| 2012/0202101 | A1* | 8/2012 | Ueda | H01M 2/021 |
| | | | | 429/127 |
| 2013/0089226 | A1* | 4/2013 | Burleigh | H04R 15/00 |
| | | | | 381/312 |
| 2013/0101884 | A1* | 4/2013 | Ueda | H01M 10/052 |
| | | | | 429/127 |
| 2013/0243236 | A1 | 9/2013 | Chamness et al. | |
| 2014/0270232 | A1* | 9/2014 | Vroom | H04R 5/0335 |
| | | | | 381/74 |
| 2015/0099185 | A1* | 4/2015 | Joo | D01D 5/003 |
| | | | | 429/231.8 |
| 2015/0123604 | A1* | 5/2015 | Lee | H01F 38/14 |
| | | | | 320/108 |
| 2016/0013459 | A1* | 1/2016 | Suh | H01M 2/0202 |
| | | | | 429/127 |
| 2017/0338492 | A1* | 11/2017 | Zimmerman | H01M 4/364 |

FOREIGN PATENT DOCUMENTS

| | | |
|---|---|---|
| JP | H0722955 Y2 * | 7/1995 |
| JP | 2010-050667 A | 3/2010 |
| JP | 2010-238403 A | 10/2010 |
| KR | 20130072181 A | 7/2013 |
| KR | 20140131115 A | 11/2014 |
| WO | 2012140709 A1 | 7/2014 |
| WO | 2015045993 A1 | 4/2015 |
| WO | 2015099514 A1 | 7/2015 |

* cited by examiner

WIRELESS HEADPHONE HAVING BUILT-IN FLEXIBLE BATTERY

CROSS REFERENCE TO RELATED APPLICATIONS

This application is the national phase entry of International Application No. PCT/KR2016/007337, filed on Jul. 6, 2016, which claims priority from the Korean patent application no. 10-2015-0096853 filed on Jul. 7, 2015, the entire contents of which are incorporated herein by reference.

TECHNICAL FIELD

The present invention relates to a wireless headphone, and more particularly, to a wireless headphone having a built-in flexible battery which uses a high capacity battery to increase a usage time thereof.

BACKGROUND

Electronic products, particularly electronic products capable of outputting sound, are becoming increasingly smaller due to technological advancement, and electronic products are connected to various types of sound outputting devices. Particularly, functions of sound outputting electronic products, such as MP3 players, are being integrated into smartphones as smartphone develop, and as reliability and simplicity of wireless communication have emerged, recent smartphones may be connected to sound outputting devices configured to use various types of wireless communication technologies.

Various types of the audio outputting devices have been proposed to improve sound shielding from external noise. Among them, although kernel-type earphones to be inserted into user's auditory canals are widely used, the kernel-type earphones have an inconvenience in that additional ear tips have to be purchased and used in order to achieve a fitting sensation while wearing because the user's auditory canals are not constant in diameter, and there is a problem in that pain occurs in the ears when the kernel-type earphones are used for a long time.

Recently, headsets configured to cover the whole ear to improve sound shielding have been in the spotlight again due to the application of wireless communication technology such as Bluetooth technology.

Bluetooth signals may be transferred directionlessly and process sound and data simultaneously. In addition, Bluetooth devices have advantages in that a Bluetooth device can have a pairing function to be used with one or multiple devices, and in that signals thereof can be exchanged through a wall without limitation of a signal transmission angle.

In order to use such a Bluetooth device, a circuit part and a power source for driving the Bluetooth chip are needed, and generally, power is supplied by a battery. Here, although a conventional dry cell battery may be used as the battery, a chargeable battery is lately being widely used as the battery to improve user convenience.

Such a battery is generally formed to be embedded in a housing forming a headset. Accordingly, a space for accommodating the battery is needed, and a size of the housing forming the headset becomes large to accommodate a large size battery in order to implement a high capacity battery, and thus, as the capacity of the battery increases, the weight thereof increases, and thus user convenience decreases.

Particularly, in the case of the headset, since, in contrast to a conventional earphone, a large speaker unit is driven, more power consumption is needed. Accordingly, a battery of a limited size installed in the housing has a limitation of having a short usage time.

SUMMARY OF THE INVENTION

The present invention is directed to a wireless headphone having a built-in flexible battery in which a flexible battery is embedded in a band part and supplies additional power thereto, and thus usage time may be innovatively increased.

In addition, the present invention is directed to a wireless headphone having a built-in flexible battery which allows a size, a thickness, and a weight of a headset part to be decreased and various designs to be implemented because an additional space for embedding a battery in the headset part is not needed in a case in which the flexible battery is used as a main battery.

In addition, the present invention is directed to a wireless headphone having a built-in flexible battery of simple recharging the flexible battery using wireless method.

One aspect of the present invention provides a wireless headphone having a built-in flexible battery embedded therein, including: a band part; a pair of headset parts including speaker units configured to receive a wirelessly transmitted audio signal and output the audio signal to the outside and connected to the band part; and a flexible battery embedded in the band part to supply power to the headset parts.

The band part may include: a frame formed in a band form having one open side; and a cover member configured to surround the frame, wherein the flexible battery may be interposed between the frame and the cover member.

The flexible battery may be disposed on each of an upper portion and a lower portion of the frame.

A circuit part including a communication portion configured to transmit and receive the audio signal to and from an external device through wireless communication may be embedded at any one of the pair of headset parts.

A battery configured to supply driving power to the circuit part may be embedded at any one of the pair of headset parts.

The flexible battery may be fixed to the band part by a wire material including a silver (Ag) nano-component.

The wireless headphone may further include a wireless power receiving antenna configured to receive a wireless power signal transmitted from an external charging device to charge power of the flexible battery.

The wireless power receiving antenna may be disposed at any one side of the band part and the headset parts.

A shielding sheet configured to shield a magnetic field may be disposed at one side of the wireless power receiving antenna.

The shielding sheet may include any one among a ribbon sheet formed of an amorphous alloy and a nanocrystalline alloy, a ferrite sheet, and a polymer sheet.

The shielding sheet may be divided into a plurality of micro-pieces, the plurality of adjacent micro-pieces may be partially or entirely insulated, and the micro-pieces may have irregular shapes.

The flexible battery may include: an electrode assembly including a positive electrode, a negative electrode, and a separator; and an exterior material configured to encapsulate the electrode assembly and an electrolyte, wherein the exterior material and the electrode assembly may include patterns configured to contract and slacken when bent, and the patterns formed on the exterior material and the electrode assembly may match each other.

The patterns may be formed along the entirety or a part of a total length of the flexible battery.

The separator may include: a non-woven fabric layer and a nanofiber web layer including polyacrylonitrile nanofiber stacked on one or both surfaces of the non-woven fabric layer.

Advantages are as below:

According to the present invention, since additional power can be supplied to a headset through a flexible battery embedded in a band part, usage time of the headset can increase innovatively.

In addition, according to the present invention, in a case in which a flexible battery is used as a main battery, since an additional space for embedding a battery is not needed in a headset part, a size, a thickness, and a weight of the headset part can be decreased, and various designs can be implemented.

In addition, according to the present invention, since a flexible battery is wirelessly charged through a wireless power receiving antenna, an additional external terminal is not needed, and thus various problems, such as a foreign material being introduced through the external terminal and the flexible battery being wetted by sweat and the like, may be prevented.

DETAILED DESCRIPTION OF THE INVENTION

Figure 1:
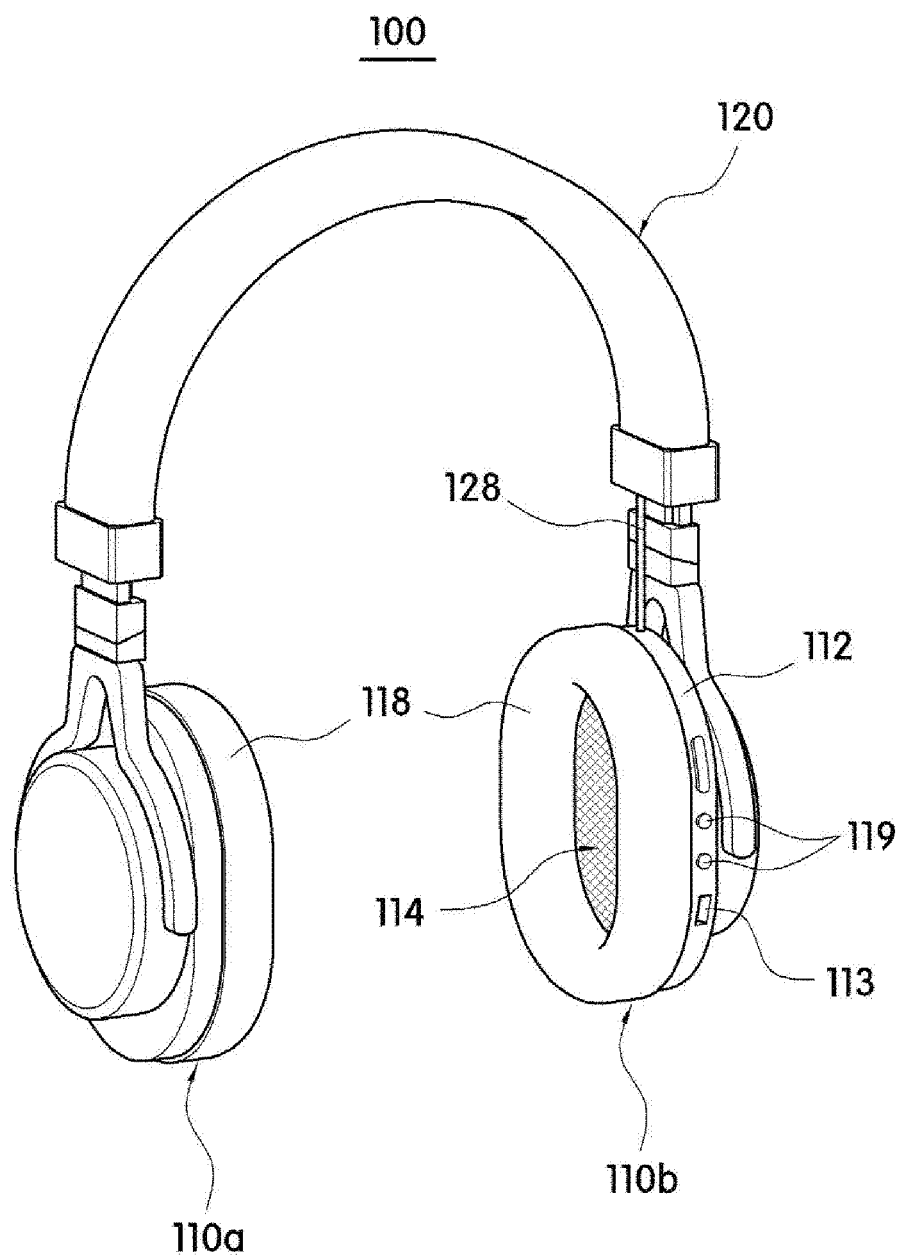
FIG. 1 is a view illustrating a wireless headphone having a built-in flexible battery according to one embodiment of the present invention.

Hereinafter, embodiments that are easily performed by those skilled in the art will be described in detail with reference to the accompanying drawings. The present invention may be implemented in several different forms, and is not limited to the embodiments described herein. Parts irrelevant to description are omitted in the drawings in order to clearly describe the embodiments of the present invention. Identical or similar parts are denoted by the same reference numerals throughout this specification.

As illustrated in FIGS. 1, 3, 7, and 8, wireless headphones 100, 100', 200, and 300 having a built-in flexible battery according to one embodiment of the present invention include headset parts 110a and 110b and a flexible battery 130.

The headset parts 110a and 110b are configured to output an audio signal wirelessly transmitted from an external device so that a user may hear the audio signal.

A pair of headset parts 110a and 110b may be provided to be in contact with both ears of the user when worn on the user, and cover members 118 having one surface made of a soft material such as leather or cloth may surround outer surfaces of housings 112 to enhance wearing sensation.

In this case, in the headset parts 110a and 110b, speaker units 114 configured to output and play an audio signal received from an external device to the outside and a circuit part 116 including a communication portion 116a for receiving the audio signal through wireless communication with the external device are embedded in the housings 112.

Here, the external device may be a portable electronic device such as a mobile phone, a portable multimedia player (PMP), and a tablet and may also be an audio device such as an audio system. In addition, a communication method of the communication portion 116a may be a Bluetooth communication method, a ZigBee communication method, or a near field communication (NFC) method.

In addition, although not illustrated in the drawings, the headset parts 110a and 110b may also include a microphone (not shown) capable of receiving a user's voice and formed at one sides of the headset parts 110a and 110b and transmit a voice signal of the user to the external device.

In this case, a power source switch configured to turn on/off the power source and a plurality of function buttons 119 configured to perform various functions, such as volume adjustment and music selection, may be provided on at least one of the headset parts 110a and 110b. Here, a music selection method may be implemented by single-clicking, double-clicking, or a triple-clicking to select the next song, a previous song, or skip one or more songs.

In addition, the function button 119 may also be implemented as a general micro switch type button, and as necessary, may be implemented as a clickable wheel button such that volume may be turned up or down by rolling the wheel button and various functions may be performed according to a clicking operation.

The circuit part 116 may include various circuits for receiving an audio signal wirelessly transmitted from an external device and may output the audio signal via the speaker units 114.

Figure 5:
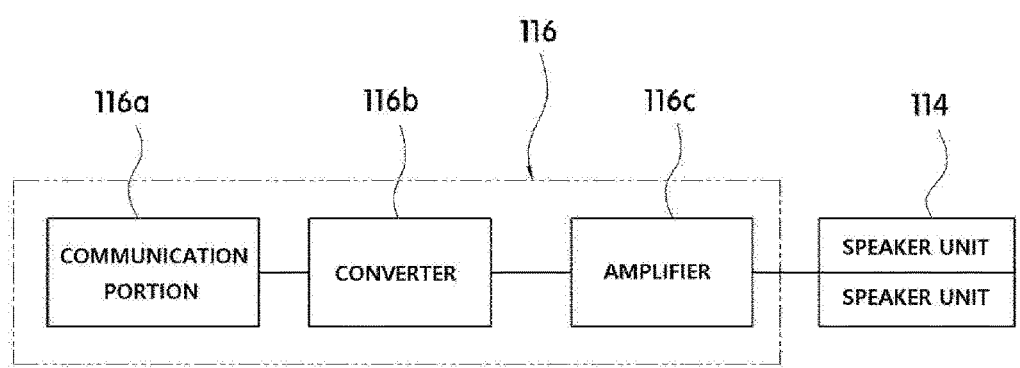
FIG. 5 is a schematic view illustrating a detailed configuration of a circuit part embedded in a headset part of the wireless headphone having a built-in flexible battery according to the present invention.

As an example, as illustrated in FIG. 5, the circuit part 116 may include the communication portion 116a configured to receive an audio signal wirelessly transmitted from an external device, a converter 116b configured to convert the audio signal received by the communication portion 116a into an electrical signal, and an amplifier 116c configured to amplify the audio signal converted into the electrical signal by the converter 116b and transmit the amplified audio signal to the speaker units 114.

Here, the speaker units 114 configured to output and play the audio signal may be provided in the pair of the headset parts 110a and 110b, and the circuit part 116 may be included in both of the pair of the headset parts 110a and 110b and may also be included in only one headset part 110b of the pair of headset parts.

In this case, a battery 111 for driving the circuit part 116 may be embedded in the one headset part 110b of the pair of headset parts. Such a battery 111 is electrically connected to the circuit part 116 and supplies power to the circuit part 116.

In addition, in the case in which the battery 111 is embedded in the headset part 110b, the circuit part 116 may include a charging circuit for charging the battery 111. In this case, as the headset part 110b may also include an additional charging port 113 electrically connected to the circuit part 116, the battery 111 may be directly charged with power supplied from the outside via the charging port 113. Here, the charging port 113 may be a Universal Serial Bus (USB) type charging port, and the charging port 113 may serve as both a charging terminal for charging the battery 111 and a data terminal through which data is input and output.

Since the above-described speaker units 114 and circuit part 116 are general components, detailed descriptions thereof will be omitted.

The band part 120 is for the user to wear the headphone on the head such that the pair of the headset parts 110a and 110b are located at the user's ears.

The band part 120 includes a frame 122 having one open side and formed in a band form, and the pair of the headset parts 110a and 110b may be connected to both ends of the frame 122. Accordingly, when the user wears each of the wireless headphones 100, 100', 200, and 300 according to the present invention, the band part 120 may surround the user's head, and the pair of the headset parts 110a and 110b connected to both ends of the band part 120 may be located at the user's ears.

Here, the band part 120 may be provided such that a cover member 126 made of a soft material such as leather, cloth, or silicone may surround the frame 122 to enhance wearing sensation for the user when the band part 120 is worn on the user.

In addition, lengths of both ends of the frame 122 connected to the pair of the headset parts 110a and 110b may also be adjusted to adjust a total length of the wireless headphone to correspond to the user when the wireless headphone is worn on the user.

Here, the band part 120 applied to the present invention may include a flexible battery 130 for supplying power to the headset parts 110a and 110b.

That is, in each of the wireless headphones 100, 100', 200, and 300 having a built-in flexible battery according to the present invention, as at least one flexible battery 130 may be embedded in the band part 120, power may be supplied to the headset part 110b, and thus total usage time may be increased.

Here, in a case in which the headset part 110b includes a separate battery 111, the flexible battery 130 may also serve as an auxiliary battery configured to assist the battery or a main battery configured to supply power to the headset part 110b.

As an example, in the case in which the flexible battery 130 is used as the main battery configured to supply power to the headset part 110b, the battery 111 for supplying power to the headset part 110b may not be needed in the headset part 110b.

Accordingly, since the headset part 110b does not need a space in which the battery 111 is disposed, a size and a thickness of the headset part 110b may decrease by as much as a size and a thickness of the battery 111. Through this, the headset part 110b applied to the present invention can be variously designed, and since the battery 111 is not needed, a weight of the headset part 110b can also decrease.

In addition, the flexible battery 130 configured to serve as the main battery or the auxiliary is embedded in the band part 120, and, in contrast with a conventional case in which a battery is embedded in only a headset part 110b, since a capacity of the battery is increased by as much as a capacity of the flexible battery 130, usage time can be increased innovatively.

Such a flexible battery 130 may be disposed at one surface or both surfaces of the frame 122, and although the flexible battery 130 may be directly connected to the circuit part 116 embedded in the headset part 110b, the flexible battery 130 may be electrically connected to the circuit part 116 via an separate circuit part 124 embedded in the band part 120.

In this case, the circuit parts 116 and 124 may be provided in form that wired charging circuits and/or wireless charging circuits are mounted on circuit boards, and the circuit parts 116 and 124 may include power converters (not shown) configured to drop an output voltage supplied from the flexible battery 130 to a suitable voltage and transmit the voltage to the headset part 110b.

In addition, the circuit parts 116 and 124 may include charging circuits configured to transmit power supplied from the outside to the flexible battery 130 and configured to recharge the flexible battery 130. Here, in a case in which the flexible battery 130 is recharged with power supplied from the outside, the circuit parts 116 and 124 may include various circuits for increasing charging efficiency, and may further include protective circuits for preventing excessive charging when the flexible battery 130 is being charged.

Here, in a case in which the circuit parts 116 and 124 are provided in the headset part 110b and the band part 120, the circuit part 124 embedded in the band part 120 may be electrically connected to circuit part 116 embedded in the headset part 110b via a cable 128 and may supply power supplied from the flexible battery 130 to the headset part 110b.

Such a flexible battery 130 may have a length substantially the same as a total length of the band part 120 or may also include a plurality of flexible batteries 130 that each have a length shorter than the total length of the band part 120 and that are connected to each other in series.

Figure 7:
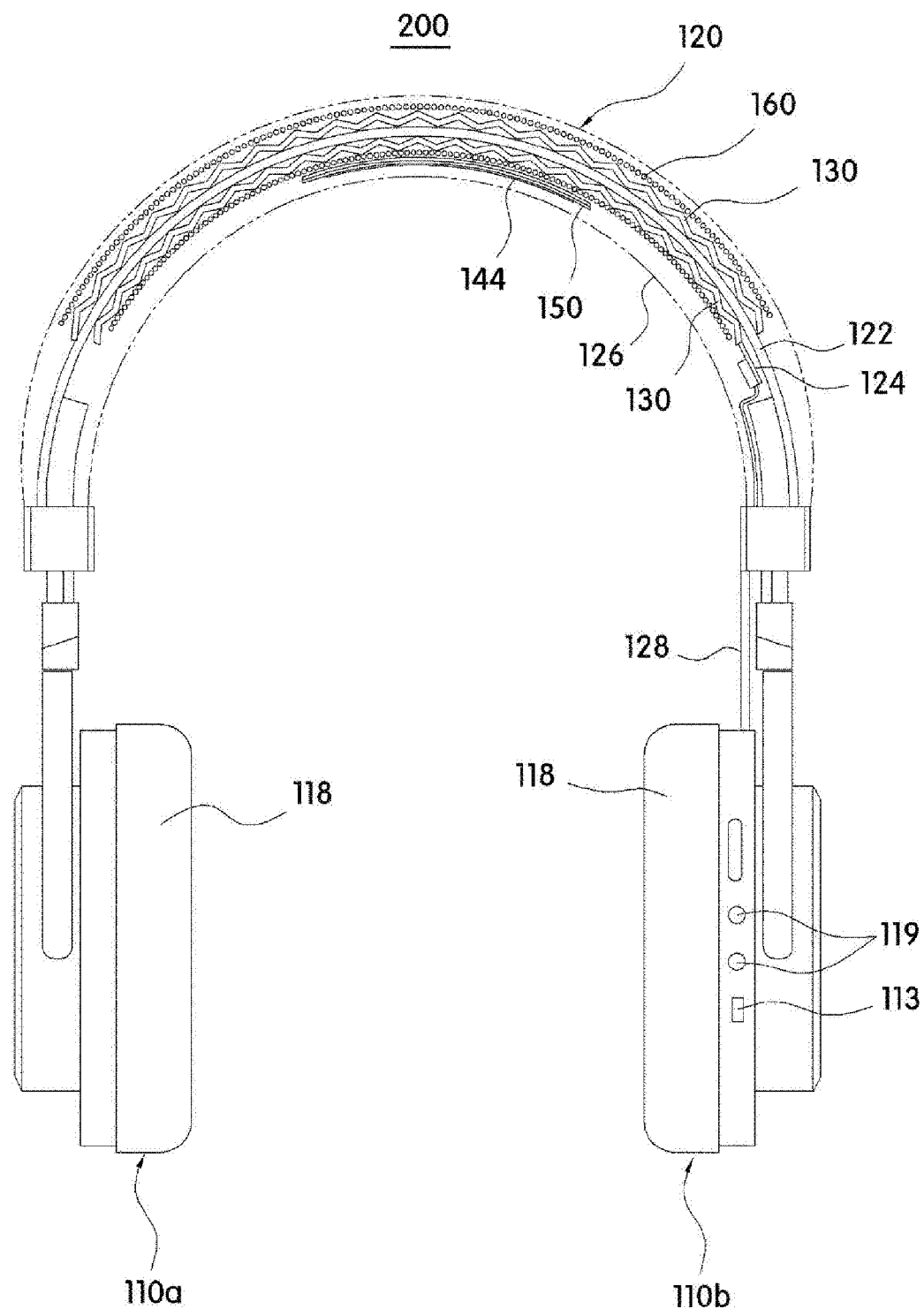
FIG. 7 is a view illustrating a form in which flexible batteries are stacked on an upper surface and a lower surface of a frame in the wireless headphone having a built-in flexible battery according to the present invention.
Figure 8:
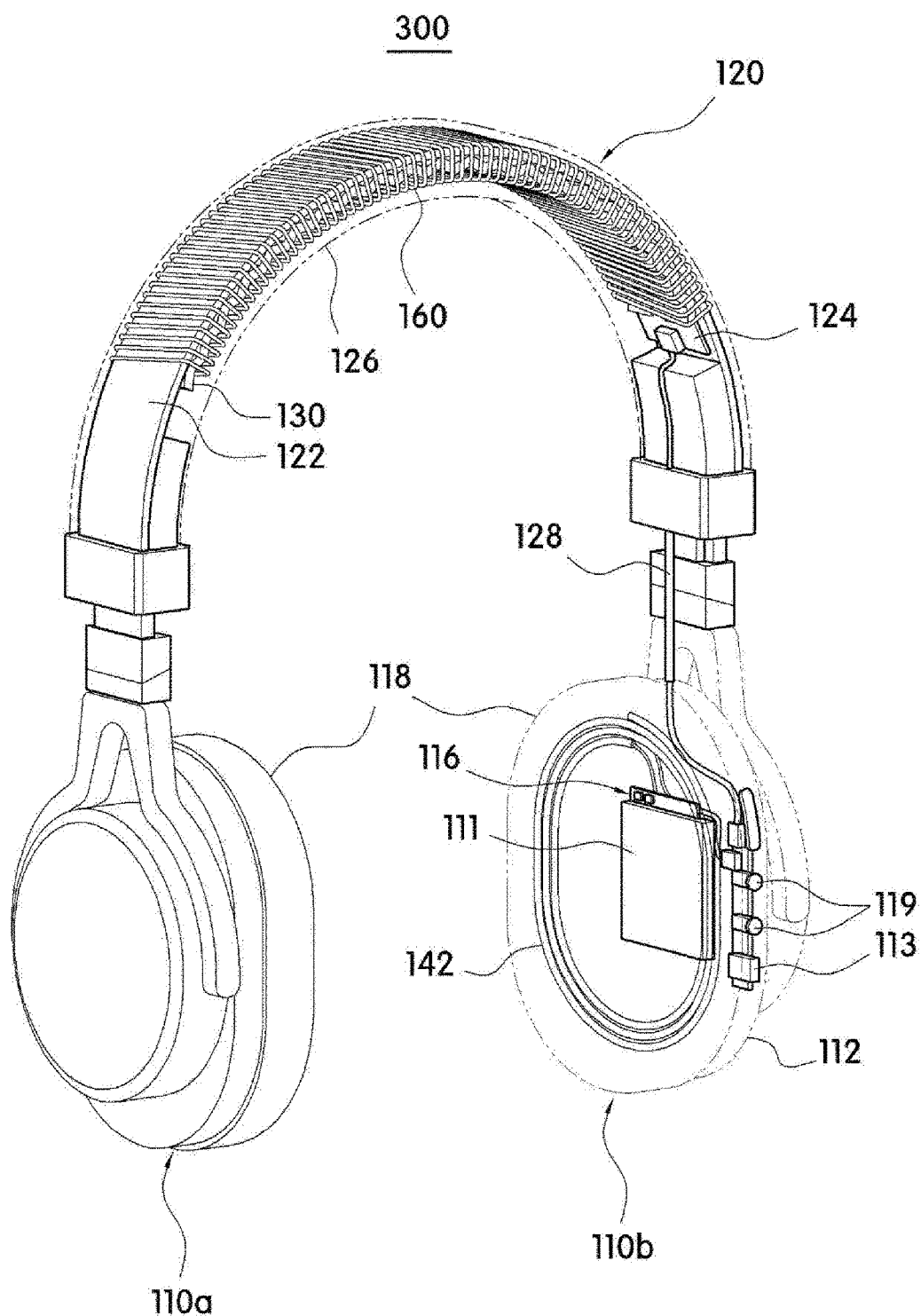
FIG. 8 is a view illustrating an example in which a wireless power receiving antenna is included in the headset part of the wireless headphone having a built-in flexible battery according to the present invention.

In addition, the flexible battery 130 may be provided at one surface of the frame 122 (see FIGS. 2 to 4) or flexible batteries 130 may be disposed at both sides of the frame 122 (see FIG. 7).

Here, the plurality of flexible batteries 130 disposed on the upper surface and the lower surface of the frame 122 may be connected to the circuit parts 116 and 124 in series or in parallel.

Through this, in the headphone 200 according to the present invention, since the plurality of flexible batteries 130 are embedded in the band part 120, a total capacity of a battery may be increased to a capacity corresponding to the number of flexible batteries 130.

Figure 9:
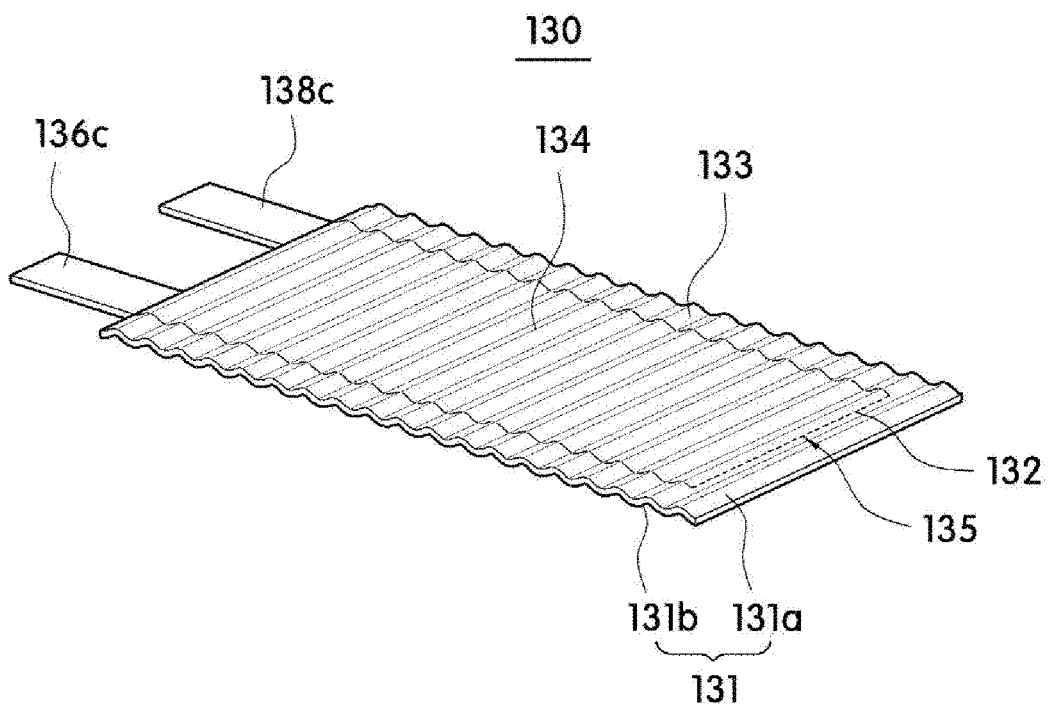
FIG. 9 is a view illustrating a flexible battery applied to the wireless headphone having a built-in flexible battery according to the present invention.

The flexible battery 130 is for supplying stored power to the headset parts 110a and 110b to increase a driving time of the circuit part 116, and as illustrated in FIG. 9, includes an exterior material 131 and an electrode assembly 135.

The exterior material 131 is formed of a plate member having a predetermined area and is for accommodating the electrode assembly 135 and an electrolyte to protect the electrode assembly 135 from an external force.

To this end, the exterior material 131 may include a pair of first exterior material 131a and second exterior material 131b, and may be sealed along an edge thereof by an adhesive to prevent the electrolyte and the electrode assembly 135 accommodated therein from being exposed to the outside and the electrolyte from leaking to the outside.

That is, as illustrated in FIG. 9, the exterior material 131 may include an accommodating portion 132 configured to accommodate the electrode assembly 135 and the electrolyte therein and include a sealing portion 133 sealed to prevent the electrode assembly 135 and the electrolyte from leaking to the outside along the edge of the accommodating portion 132.

The exterior material 131 may include two members such as the first exterior material 131a and the second exterior material 131b, and the sealing portion 133 configured to face each other may be sealed by the adhesive, or the exterior material 131 may be formed in one member, and folded in half in a width or longitudinal direction, and then the remaining portions, which face each other, may be sealed by an adhesive.

Figure 10:
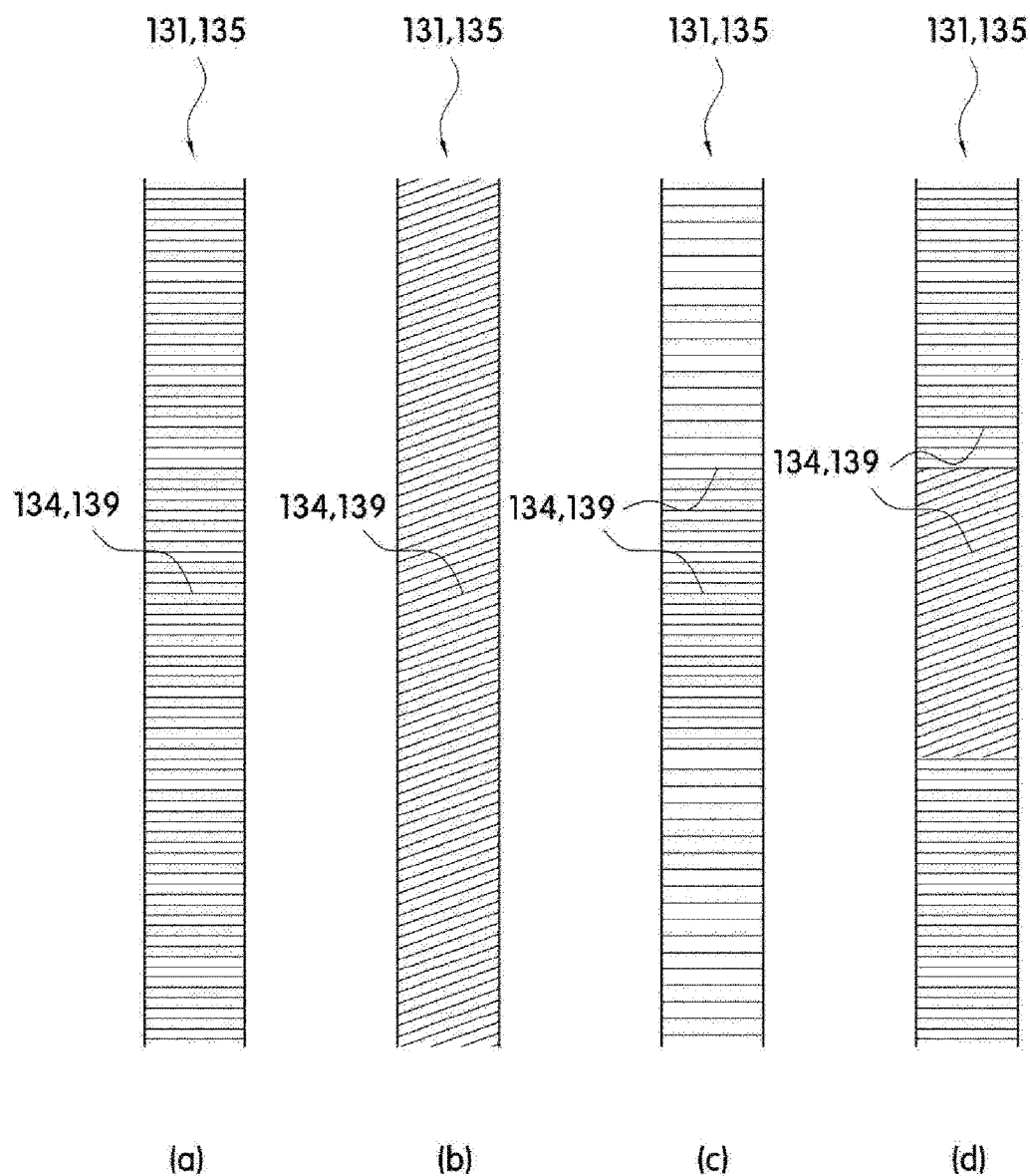
FIG. 10 is a schematic view illustrating various forms of patterns formed on an exterior material and an electrode assembly in FIG. 9.
Figure 11:
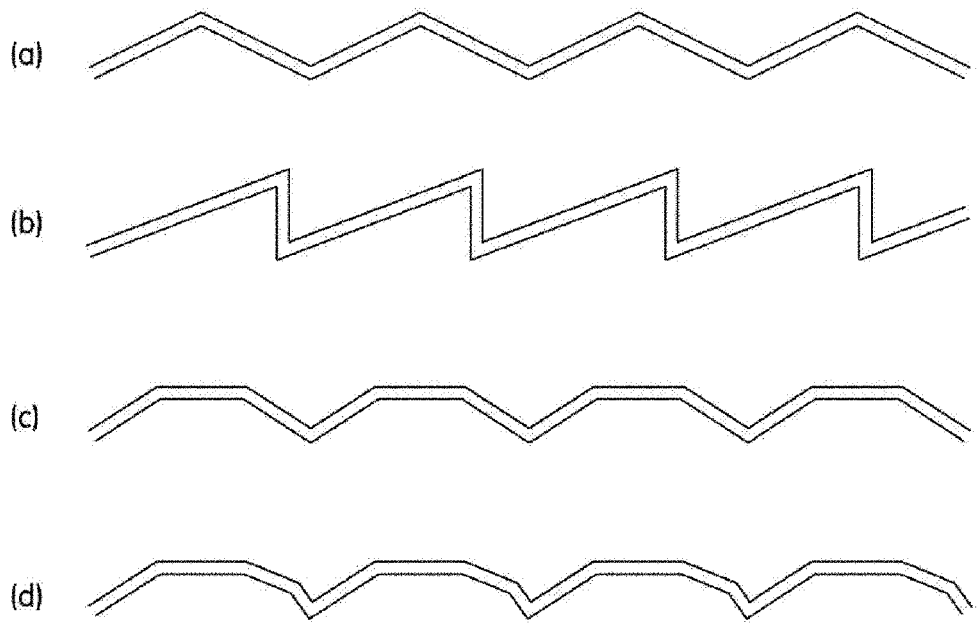
FIGS. 11 to 14 are views illustrating various forms of patterns on the flexible battery applied to the headphone having a built-in flexible battery according to the present invention.
Figure 12:
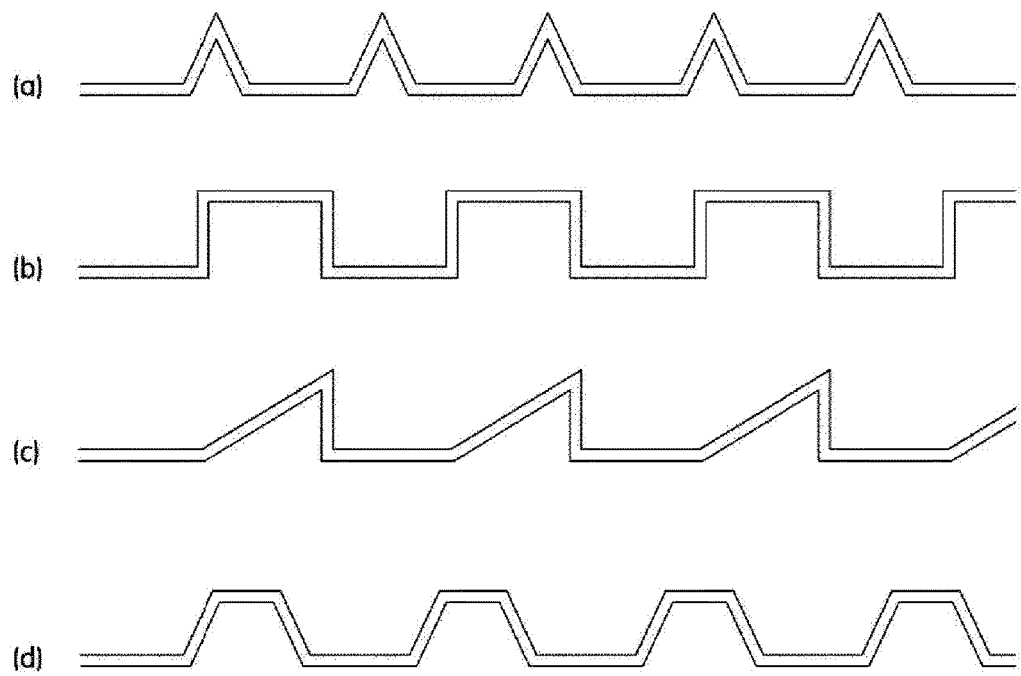
Figure 13:
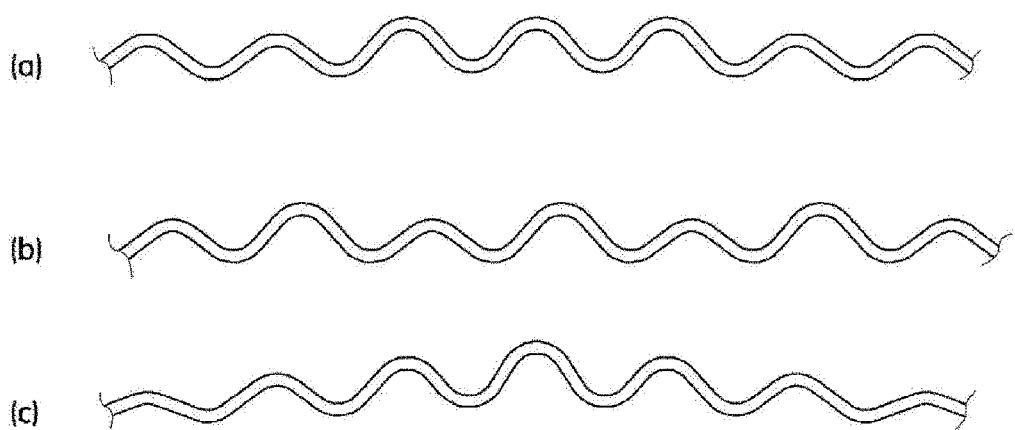
Figure 14:
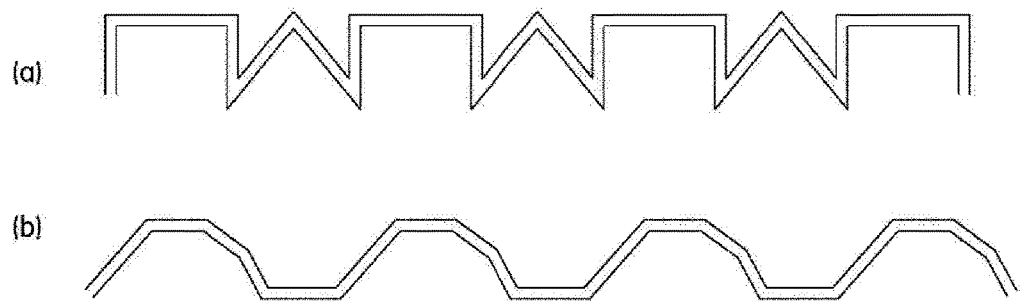

In this case, as illustrated in FIG. 10, the exterior material 131 may include a pattern 134 on at least one surface thereof such that the exterior material 131 contracts and slackens while bent.

Such a pattern 134 may be formed such that peak portions and valley portions are repeatedly disposed in a longitudinal or width direction of the exterior material 131.

Specifically, the peak portions and the valley portions of the pattern 134 may be parallel with respect to a straight line parallel to the width direction of the exterior material 131 (see FIGS. 10A and 10C), or may be inclined at a predetermined angle with respect to the straight line parallel to the width direction of the exterior material 131 (see FIG. 10B), or a combination of both a pattern in which the peak portions and the valley portions parallel with respect to the straight line parallel to the width direction of the exterior material 131 and a pattern in which peak portions and the valley portions are inclined at a predetermined angle with respect to the straight line parallel to the width direction of the exterior material 131 may be formed (see FIG. 10D).

In addition, the pattern 134 may be provided such that distances between the adjacent peak portions and the adjacent valley portions may be the same (see FIGS. 10A and 10B) or distances between the adjacent peak portions and the adjacent valley portions may be different, or a combination of identical and different distances may also be formed (see FIG. 10C).

Accordingly, the flexible battery 130 applied to the present invention may be easily contracted and slackened in the longitudinal direction due to the pattern 134 when bent.

Thus, even when the exterior material 131 is repeatedly bent, it is possible to reduce a degree of fatigue of the exterior material 131 itself because a change amount of the exterior material 131 itself is cancelled out or minimize, and it is possible to protect the electrode assembly 135 because deformation of the electrode assembly 135 disposed in the exterior material 131 is prevented or the amount of deformation of the electrode assembly 135 is minimize.

Accordingly, the headphone according to the present invention may prevent performance degradation of the flexible battery 130 due to the pattern 134, even when the flexible battery 130 is embedded in the band part 120, which is repeatedly deformed during use of the headphone.

Such a pattern 134 may be formed on all or a part of a surface of the exterior material 131, and may be formed along the entirety or a part of a total length of the exterior material 131.

Figure 15:
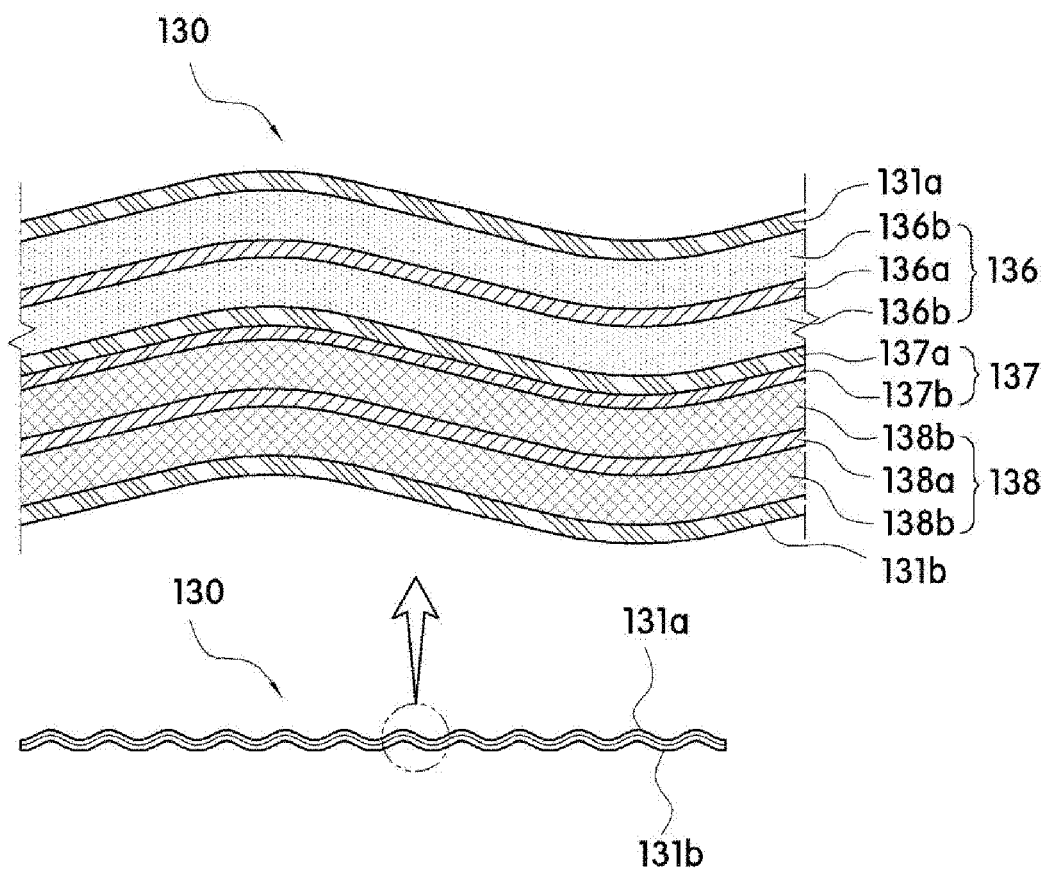
FIG. 15 is an enlarged cross-sectional view illustrating a detailed configuration of the flexible battery applied to the wireless headphone having a built-in flexible battery according to one embodiment of the present invention.

As illustrated in FIG. 15, the electrode assembly 135 may be encapsulated together with the electrolyte in the exterior material 131 and may include a positive electrode 136, a negative electrode 138, and a separator 137, and the positive electrode 136 and the negative electrode 138 may be separated by the separator 137 interposed between the positive electrode 136 and the negative electrode 138.

In this case, the positive electrode 136 may include a positive current collector 136a and a positive active material 136b, and the negative electrode 138 may include a negative current collector 138a and a negative active material 138b, and at least one of the positive and negative electrodes may be integrally formed with the separator 137.

Here, a negative terminal 138c and a positive terminal 136c may be provided to respectively extend from bodies of the negative current collector 138a and positive current collector 136a. The positive terminal 136c and the negative terminal 138c may be electrically connected to the circuit parts 116 and 124.

Meanwhile, the separator 137 may include a non-woven fabric layer 137a and a nanofiber web layer 137b stacked on one or both surfaces of the non-woven fabric layer.

Here, the nanofiber web layer 137b may be nanofiber including one or more selected from polyacrylonitrile nanofiber and polyvinylidene fluoride nanofiber.

Preferably, the nanofiber web layer 137b may include only the polyacrylonitrile nanofiber to ensure spinnability and uniform pore formation when formed. In addition, an average diameter of the polyacrylonitrile nanofiber of the nanofiber web layer 137b may range from 0.1 to 2 μm, and preferably range from 0.1 to 1.0 μm.

This is because, when the average diameter of the nanofiber is less than 0.1 μm, there may be a problem in that the separator may not ensure sufficient thermal resistance, and when the average diameter of the nanofiber is greater than 2 μm, although the separator has superior mechanical strength, an elastic force of the separator may be reduced.

In addition, one or more selected from among cellulose, cellulose acetate, polyvinyl alcohol (PVA), polysulfone, polyimide, polyetherimide, polyamide, polyethylene oxide (PEO), polyethylene (PE), polypropylene (PP), polyethylene terephthalate (PET), polyurethane (PU), poly methylmethacrylate (PMMA), and polyacrylonitrile may be used as the non-woven fabric forming the non-woven fabric layer 137a.

Here, the non-woven fabric layer may further include an inorganic additive, and the inorganic additive may include one or more selected from among SiO, SnO, $SnO_2$, $PbO_2$, ZnO, $P_2O_5$, CuO, MoO, $V_2O_5$, $B_2O_3$, $Si_3N_4$, $CeO_2$, $Mn_3O_4$, $Sn_2P_2O_7$, $Sn_2B_2O_5$, $Sn_2BPO_6$, $TiO_2$, $BaTiO_3$, $Li_2O$, LiF, LiOH, $Li_3N$, BaO, $Na_2O$, $Li_2CO_3$, $CaCO_3$, $LiAlO_2$, $SiO_2$, $Al_2O_3$, and polytetrafluoroethylene (PTFE).

In addition, an average particle size of an inorganic particle that is the inorganic additive may range from 10 to 50 nm, preferably from 10 to 30 nm, and more preferably from 10 to 20 nm. In addition, an average thickness of the separator may range from 10 to 131 µm, and preferably from 10 to 50 µm.

This is because, when the average thickness of the separator is less than 10 µm, the separator is too thin to ensure long-term durability of the separator due to repeated bending and/or spreading of the battery, and when the average thickness of the separator is greater than 131 µm, it is disadvantageous for making the flexible battery thinner. Therefore, the average thickness of the separator has an average thickness within the above-described range.

In addition, an average thickness of the non-woven fabric layer ranges from 10 to 30 µm, preferably from 15 to 30 µm, and an average thickness of the nanofiber web layer preferably ranges from 1 to 5 µm.

In addition, the positive current collector and/or the negative current collector may be formed of a thin metal foil formed of a band form having a predetermined length and made of copper, aluminum, stainless steel, nickel, titanium, chromium, manganese, iron, cobalt, zinc, molybdenum, tungsten, silver, gold, or a combination thereof.

The positive active material may include a positive active material capable of reversibly intercalating and deintercalating lithium ions, and a representative example of the positive active material may be a lithium-transition metal oxide such as $LiCoO_2$, $LiNiO_2$, $LiMnO_2$, $LiMn_2O_4$ or $LiNi_{1-x-y}Co_xM_yO_2$ ($0 \leq x \leq 1$, $0 \leq y \leq 1$, $0 \leq x+y \leq 1$, and M is a metal such as Al, Sr, Mg, or La.). However, in the present invention, a different kind of positive active material may also be used instead of the above-described positive active material.

In addition, the negative active material 138b may include a negative active material capable of reversibly intercalating and deintercalating lithium ions, and the negative active material 138b may be selected from the group consisting of a carbon-based negative active material, such as crystalline or amorphous carbon, carbon fiber, or a carbon composite, tin oxide, lithiated-tin oxide, lithium, a lithium alloy, and a mixture thereof. However, the present invention is not limited to the above described negative active materials.

Meanwhile, the positive active material 136b and the negative active material 138b may contain a PTFE component to prevent delamination thereof from the positive current collector 136a and the negative current collector 138a and cracking of the positive active material layer and the negative active material layer.

In this case, although the electrode assembly 135 may be formed in a flexible plate shape, the electrode assembly 135 may include a pattern 139 the same as the pattern 134 formed on the exterior material 131 to contract and slacken when bent similarly to the exterior material 131.

That is, the positive electrode 136, the negative electrode 138, and the separator 137 forming the electrode assembly 135 may include a pattern 139 the same as the pattern 134 formed on the exterior material 131 to contract and slacken when bent.

Here, the pattern 139 formed on the electrode assembly 135 may be formed to be parallel with respect to a straight line parallel to a width direction thereof and to be similar to the pattern 134 formed on the exterior material 131 (see FIG. 10A), or may be formed to be inclined at a predetermined angle with respect to the straight line parallel to the width direction thereof (see FIG. 10B), or the pattern 139 may have a pattern in which the above described patterns are used in combination (see FIG. 10D).

However, there is no problem as long as the pattern 134 formed on the exterior material 131 is the same as the pattern 139 formed on the electrode assembly 135.

In addition, as illustrated in FIGS. 11 to 14, in the patterns 134 and 139, the peak portions and the valley portions may be formed to be continuous or discontinuous, and a cross-sectional shape of the peak portions and the valley portions may be formed of one of more patterns selected from among a straight line pattern, a prism pattern, a semicircle pattern, a wave pattern, a polygonal pattern, and a pattern in which the above patterns are used in combination.

Accordingly, although the band part 120 is folded or bent while carried or used, since the flexible battery 130 embedded in the band part 120 may also be folded or bent due to the patterns 134 and 139 for allowing contracting and slackening similar to that of the band part 120, breakage or damage of the flexible battery 130 embedded in the band part 120 due to repeated bending may be prevented, and thus the performance thereof as a battery can be prevented from degrading.

Meanwhile, the flexible battery 130 embedded in the band part 120 may be integrated with the frame 122 using a wire material 160.

Figure 2:
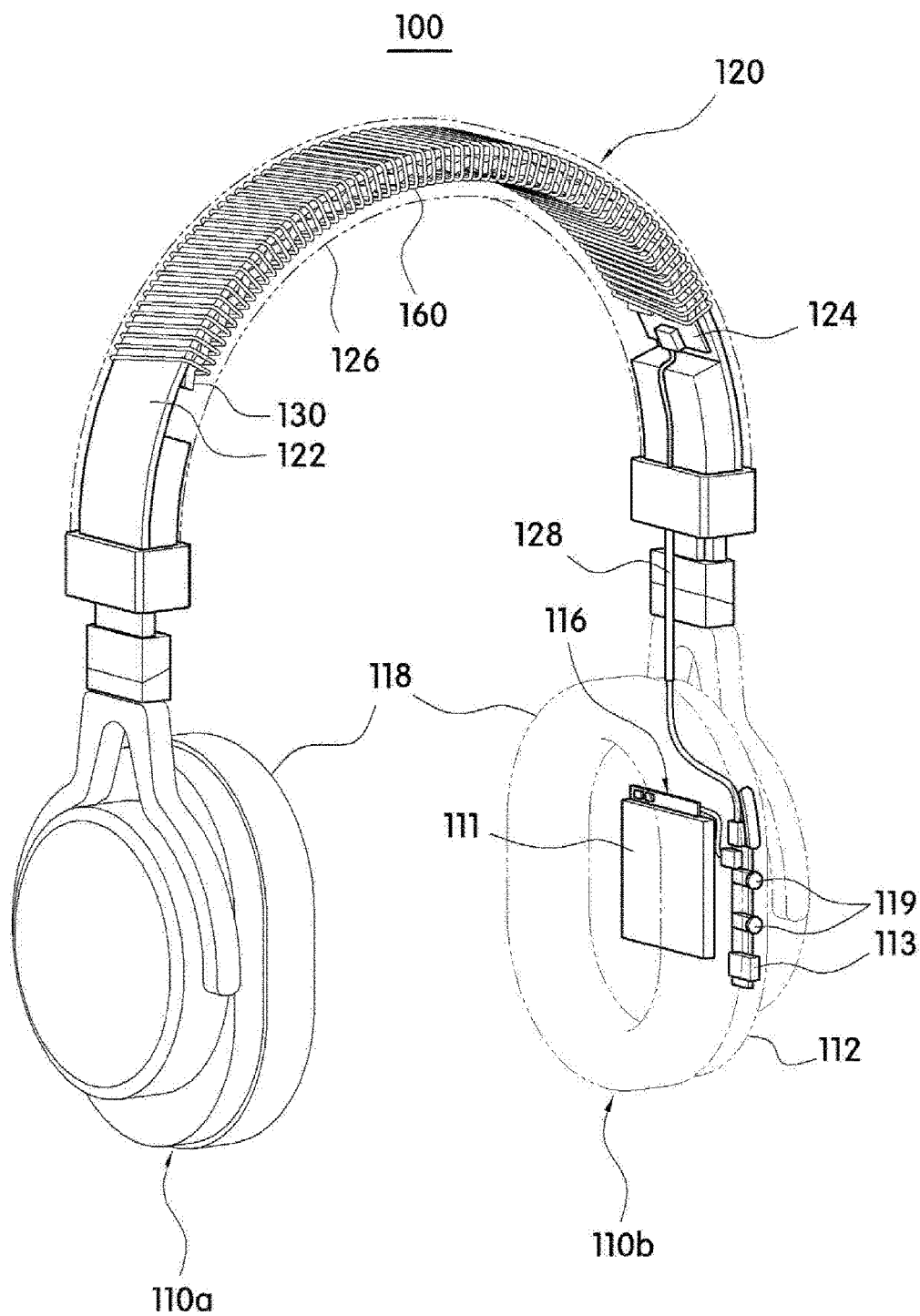
FIG. 2 is a view illustrating main components embedded in the wireless headphone illustrated in FIG. 1.
Figure 3:
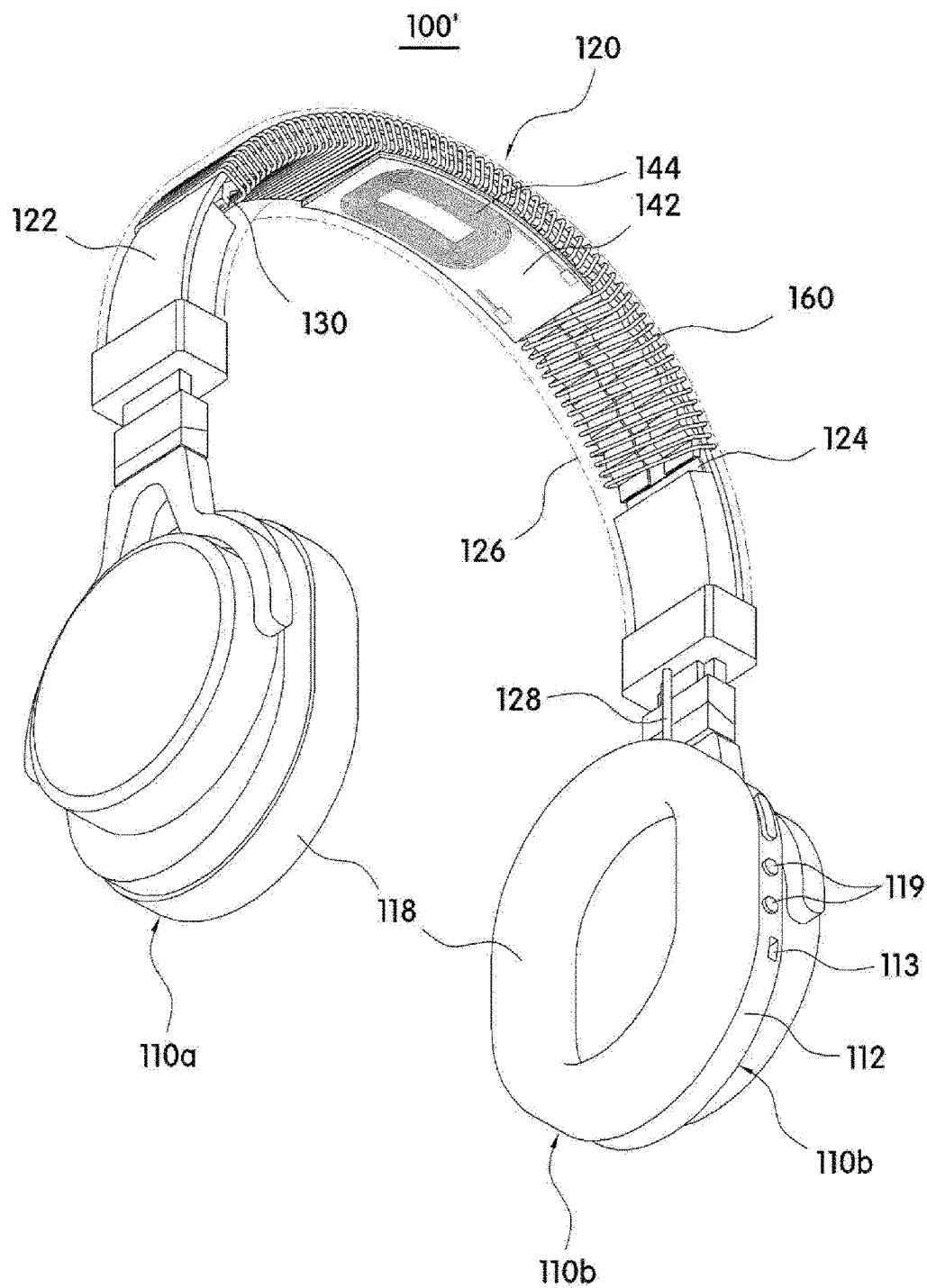
FIG. 3 is a view illustrating a case in which the wireless headphone having a built-in flexible battery according to the present invention includes a wireless power receiving antenna at a band part thereof.
Figure 4:
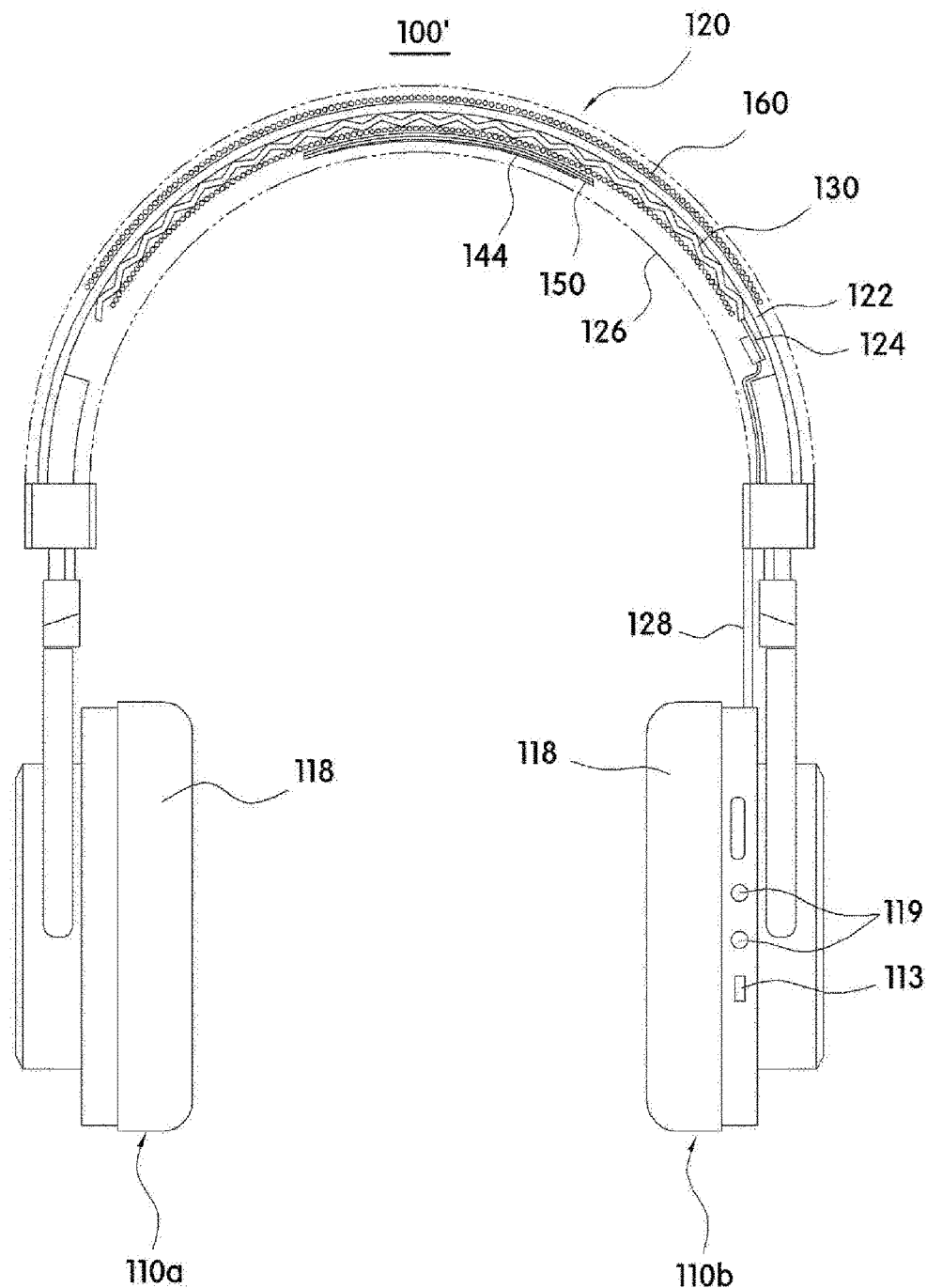
FIG. 4 is a front view illustrating the headphone illustrated in FIG. 3.

That is, as illustrated in FIGS. 2 to 4, as the wire material 160 winds the frame 122 together with the flexible battery 130 disposed at one side or both sides of the frame 122, the flexible battery 130 and the frame 122 may be integrated even without use of an additional adhesive.

The wire material 160 may be provided along the entirety or a part of a total length of the flexible battery 130 and the frame 122.

In this case, the wire material 160 may include a silver (Ag) nano-component, and thus provide excellent antibacterial, sterilizing, antifungal, deodorization, water vein wave blocking, and electromagnetic wave shielding effects to the flexible battery 130.

That is, the wire material 160 may be formed of pure silver having a purity of 99.99% and formed as a silver thread type wire material formed of a silver alloy including a metal such as copper.

Figure 16A:
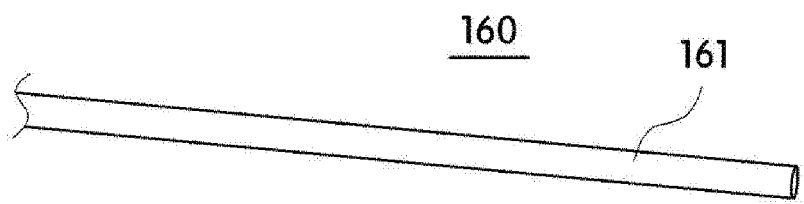
FIGS. 16A to 16D are views illustrating various forms of wire materials used in the wireless headphone having a built-in flexible battery according to the present invention.

As illustrated in FIG. 16A, the wire material 160 may be one silver thread 161 winding the flexible battery 130 and the frame 122, or be a plurality of silver threads 161 winding the flexible battery 130 and the frame 122 at the same time.

Figure 16B:
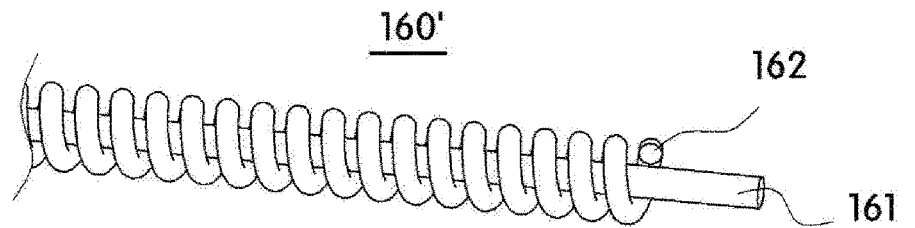
Figure 16B:
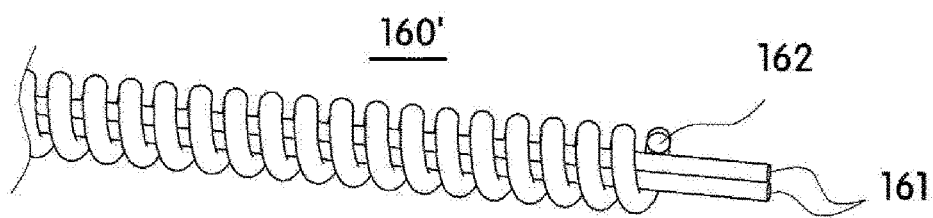

In addition, as illustrated in FIG. 16B, a wire material 160' may be a yarn thread in which one or a plurality of silver threads 161 are used as a core thread, a fiber thread formed of natural fiber or synthetic fiber is used as a winding thread 162, and then the winding thread 162 is wound around the silver threads 161 in a longitudinal direction of the silver threads 161.

Figure 16C:
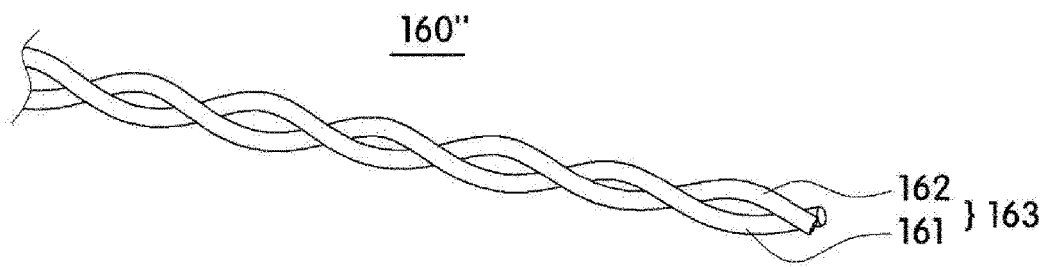

In addition, as illustrated in FIG. 16C, a wire material 160" may be a yarn thread 163 in which a silver thread 161 formed of silver or silver alloy is used as a first core thread, a fiber thread 162 formed of natural fiber or synthetic fiber is used as a second core thread, and then the silver thread 161 and the fiber thread 162 are combined and twisted by a twisting machine.

Figure 16D:
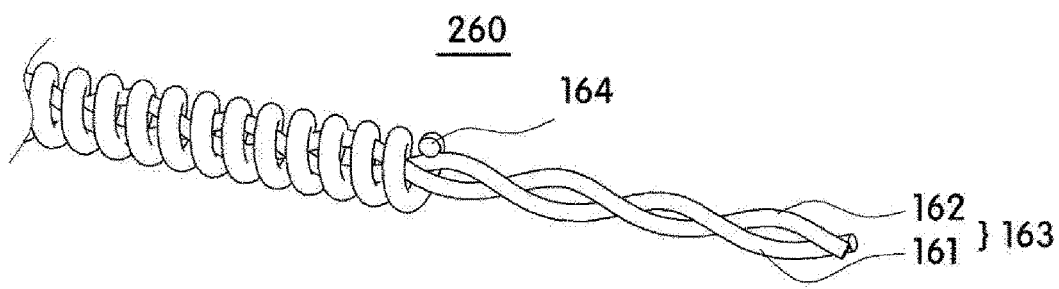

In addition, as illustrated in FIG. 16D, a wire material 260 may also be formed by using the yarn thread 163 illustrated in FIG. 16C as a core thread, using a fiber thread formed of any one of natural fiber and synthetic fiber as a winding thread 164, and then winding the winding thread 164 around the yarn thread 163 in a longitudinal direction of the yarn thread 163.

That is, a single silver thread or yarn thread in which a metal or non-metal is twisted with the silver thread may be used as the wire material, and the wire material may be formed with one or a plurality of threads.

Here, the natural fiber may be, for example, fiber made of any one among natural paper, poly lactic acid (PLA, biodegradable fiber), cotton, hemp, wool, and silk, and for example, fiber composed of any one of a nylon, a polyester-based fiber, a polyvinyl chloride-based fiber, a polyacrylonitrile-based fiber, a polyamide-based fiber, a polyolefin-based fiber, a polyurethane-based fiber, and a polyfluoroethylene-based fiber may be used as the synthetic fiber.

However, other known fibers may be used as the natural fiber or the synthetic fiber in addition to the above-described fiber materials.

Meanwhile, the silver nano-component may be harmless to the human body and may control over 650 kinds of bacteria, viruses, and fungi. That is, the silver nano-component may be a semi-permanent antimicrobial agent attached to a —SH group of a protein cysteine that is formed by a bacteria or virus, and converted into a sulfur compound to inhibit reproduction or attached to an enzyme that acts on oxygen, thereby serving as a catalyst configured to promote an oxidation reaction that sterilizes bacteria, that is, specifically acting on areas involved in metabolism (digestion, respiration) to execute the antibacterial function.

Meanwhile, far infrared rays are mainly supplied by the sun, but far infrared ceramics suitable for a biological rhythm may be formed by combining various mineral matter, and silver (Ag) does not have substances harmful to the human body, has a high far infrared ray emissivity, and contains a large amount of silver ions (delta ions).

Accordingly, in each of the wireless headphones 100, 100', 200, and 300 having a built-in flexible battery according to the present invention, since the wire material 160 includes a silver nano-component, the wire material 160 may emit far infrared rays and silver ions, help activate the cells of the human body, and easily circulate the blood.

Here, the silver nano-component may range from 1 to 20 wt % of a total weight of the wire material 160. In addition, the silver nano-component may include one or more of silver salts, a nano silver, and silver ion exchangers.

Meanwhile, the flexible battery 130 included in the band part 120 may be charged through a wired method via the charging port 113, but may also be recharged through a wireless method.

To this end, each of the wireless headphones 100', 200, and 300 having a built-in flexible battery according to the present invention may include at least one wireless power receiving antenna 144 for wirelessly recharging the flexible battery 130.

In this case, the wireless power receiving antenna 144 may be disposed at the band part 120 (see FIGS. 3 and 4) or at the headset part 110b (see FIG. 8) and may be electrically connected to the above-described circuit parts 116 and 124.

Here, the wireless power receiving antenna 144 is for receiving a wireless power signal having a predetermined frequency band transmitted from an external charging device and for generating power for recharging the flexible battery 130. In this case, the wireless power receiving antenna 144 may use a magnetic induction method or self-resonance method.

The wireless power receiving antenna 144 may be a coil type antenna including a coil wound thereon in a clockwise or counterclockwise direction, or may be formed by etching a metal film such as a copper film formed on one surface of a circuit board 142 or by using a conductive ink to form a pattern on one surface thereof.

In this case, the wireless power receiving antenna 144 may also be embedded in the band part 120 or the headset part 110b, or adhered to one of the band part 120 and the headset part 110b and be protected by an additional protective film.

In addition, in a case in which the wireless power receiving antenna 144 is formed at one surface of the circuit board 142 and a separate circuit part 124 is provided at the side of the band part 120, the circuit board 142 may be integrally formed with the circuit board forming the circuit part 124, or the circuit board 142 and the circuit board may be formed as separate members.

In addition, although not illustrated in the drawings, each of the headphones 100', 200, and 300 may further include another antenna configured to serve a different function from the wireless power receiving antenna 144. As an example, each of the headphones 100', 200, and 300 may include an NFC antenna, or may further include a magnetic secure transmission (MST) antenna.

Meanwhile, in a case in which the wireless power receiving antenna 144 is disposed at the side of the headset part 110b, as in the drawings, the wireless power receiving antenna 144 is embedded in the cover member 118 but is not limited thereto, and may be disposed inside the housing 112, interposed between the cover member 118 and housing 112, and suitably changed by considering placement relative to the speaker unit 114.

In addition, the circuit parts 116 and 124 may be integrally or separately formed according to the relative placement of the flexible battery 130 and the wireless power receiving antenna 144. In addition, the circuit parts 116 and 124 may be variously changed according to design restraints, as long as the above-described flexible battery 130 and the wireless power receiving antenna 144 are electrically connected.

A shielding sheet 150 configured to shield a magnetic field generated by the wireless power receiving antenna 144 may be disposed on one surface of the wireless power receiving antenna 144 to increase wireless charging efficiency.

The shielding sheet 150 may be formed of a plate member having a predetermined area and formed of a magnetic material to shield the magnetic field generated by the wireless power receiving antenna 144 and concentrate the magnetic field in a designated direction, and may also be formed of various known materials.

As an example, a ribbon sheet including at least one or more of an amorphous alloy and a nanocrystalline alloy, a ferrite sheet, a polymer sheet, or the like may be used as the shielding sheet.

Preferably, a ribbon sheet capable of being thinned and realizing high permeability may be used as the shielding sheet.

Here, the ferrite sheet may be a Mn—Zn ferrite or a Ni—Zn ferrite, and a Fe-based or Co-based magnetic alloy may be used as the amorphous alloy or nanocrystalline alloy.

In addition, the shielding sheet 150 may be flaked to reduce eddy current generation and may be separated into a plurality of micro-pieces. In addition, adjacent micro-pieces among the plurality of micro-pieces may be entirely or partially insulated from each other, and each of the micro-pieces may be randomly formed in irregular shapes. Here, each of the micro-pieces may have a size ranging from 1 μm to 3 mm.

Figure 6:
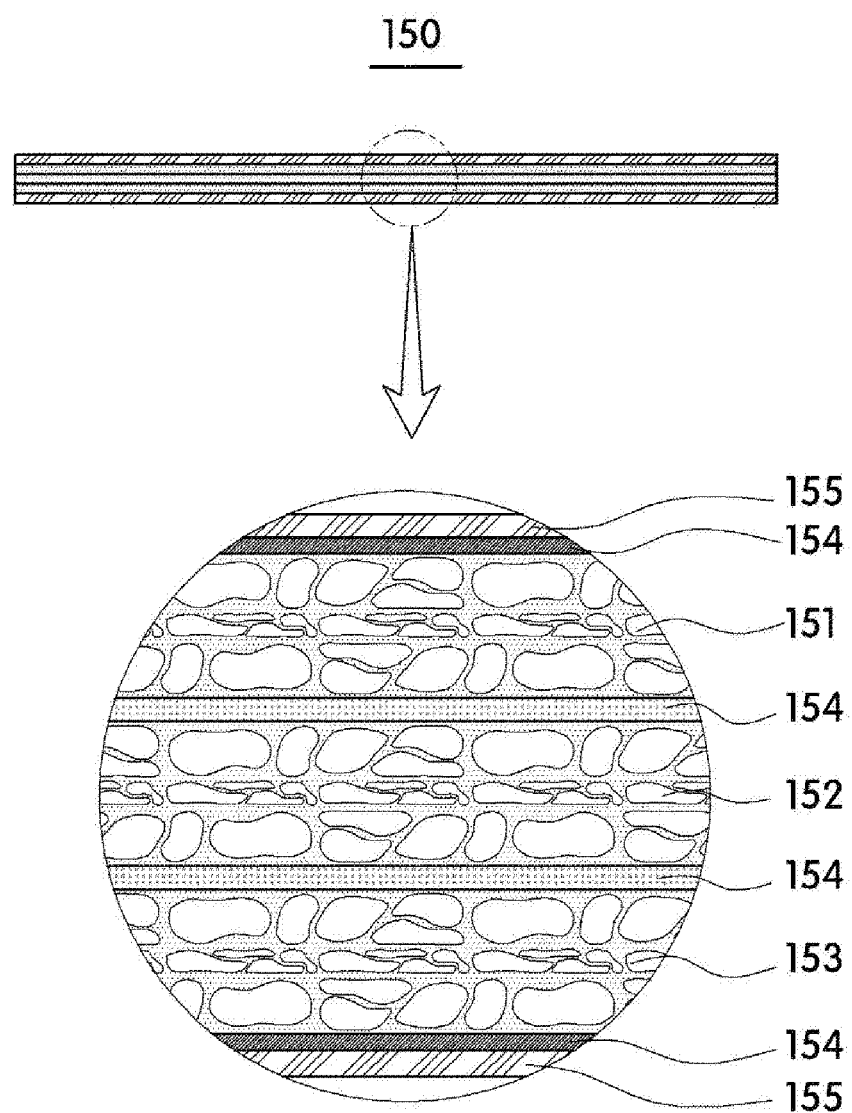
FIG. 6 is a view illustrating one type of a shielding sheet applied to the wireless headphone having a built-in flexible battery according to the present invention.

In addition, the shielding sheet 150 may be a multilayered sheet in which a plurality of sheets are stacked in multiple layers to increase permeability (see FIG. 6).

As an example, the shielding sheet 150 may include a plurality of ribbon sheets 151, 152, and 153 including at least one of an amorphous alloy and a nanocrystalline alloy, adhesive layers 154 may be stacked between the ribbon sheets 151, 152, and 153 to form a multilayer structure, and a plurality of ribbon sheets 151,152, and 153 may be divided into a plurality of micro-pieces.

In addition, adjacent micro-pieces among the plurality of micro-pieces may be entirely or partially insulated from each other, and each of the micro-pieces may be randomly formed in irregular shapes. In this case, the adhesive layers 154 may include a nonconductive component, and at least a portion of the adhesive member permeates into a gap between the plurality of micro-pieces to serve to entirely or partially insulate adjacent micro-pieces.

Here, the adhesive layer may be provided as adhesive or may be provided as a substrate type on which an adhesive is applied to one or both sides thereof, and protective films 155 for protecting the shielding sheet 150 may also be adhered to an upper surface and the lower surface of the shielding sheet 150.

Since the shielding sheet 150 is a known component, detailed description thereof will be omitted, and all known shielding sheets configured to be used as a shielding sheet may be used as the shielding sheet 150.

While one embodiment of the present invention has been described above, the spirit of the present invention is not limited to the described embodiment in the specification, those skilled in the art may easily propose different embodiments by adding, modifying, removing, supplementing components and the like within the same spiritual range, and these will also fall in the range of the spirit of the present invention.

The invention claimed is:

1. A headphone, comprising: a band part; a pair of headset parts including speaker units configured to receive a wirelessly transmitted audio signal and output the audio signal through the speaker units, wherein the pair of headset parts is connected to the band part; and
   a flexible battery embedded in the band part to supply power to the headset parts;
   wherein the flexible battery includes an electrode assembly including a positive electrode, a negative electrode, and a separator; and an exterior material configured to encapsulate the electrode assembly and an electrolyte;
   wherein the exterior material includes a first exterior material configured to cover an upper surface of the electrode assembly and a second exterior material configured to cover a lower surface of the electrode assembly;
   wherein the exterior material and the electrode assembly include patterns configured to contract and slacken when bent, and a pattern formed on the exterior material and a pattern formed on the electrode assembly, both patterns are disposed such that peak portions and valley portions are formed in a longitudinal direction and are formed such that the peak portions are formed within each other; wherein the pattern formed on and along an entirety of a total length of the first exterior material and the pattern formed on and along an entirety of a total length of the second exterior material are disposed such that the peak portions are formed within each other: wherein the peak portions form a plurality of adjacent peak portions: the valley portions form a plurality of adjacent valley portions: wherein the plurality of adjacent peak portions and the plurality of adjacent valley portions are separated by a different distance along the entirety of the total length of the first exterior material and the second exterior material.

2. The headphone of claim 1, wherein the band part includes a frame formed in a band form having one open side; and a cover member configured to surround the frame, wherein the flexible battery is interposed between the frame and the cover member.

3. The headphone of claim 2, wherein the flexible battery is disposed on each of an upper portion and a lower portion of the frame.

4. The headphone of claim 1, wherein a circuit part including a communication portion configured to transmit and receive the audio signal to and from an external device through wireless communication is embedded at any one of the pair of headset parts.

5. The headphone of claim 4, wherein a second battery configured to supply driving power to the circuit part is embedded in any one of the pair of headset parts.

6. The headphone of claim 1, wherein the flexible battery is fixed to the band part by a wire material including a silver (Ag) nano component.

7. The headphone of claim 1, further comprising a wireless power receiving antenna configured to receive a wireless power signal transmitted from an external charging device to charge power of the flexible battery with power.

8. The headphone of claim 7, wherein the wireless power receiving antenna is disposed at any one side of the band part and the headset parts.

9. The headphone of claim 7, wherein a shielding sheet configured to shield a magnetic field is disposed at one side of the wireless power receiving antenna.

10. The headphone of claim 9, wherein the shielding sheet is one selected from the group consisting of a ribbon sheet formed of an amorphous alloy and a nanocrystalline alloy, a ferrite sheet, and a polymer sheet.

11. The headphone of claim 9, wherein the shielding sheet is divided into a plurality of micro-pieces.

12. The headphone of claim 1, wherein the patterns are formed along the entirety or a part of a total length of the flexible battery.

13. The headphone of claim 1, wherein the patterns are formed such that the peak portions and the valley portions are repeatedly disposed in a longitudinal or width direction of the flexible battery.

14. The headphone of claim 1, wherein the separator includes a non-woven fabric layer; and a nanofiber web layer including polyacrylonitrile nanofiber stacked on one or both surfaces of the non-woven fabric layer.

15. The headphone of claim 1, wherein the separator has peak portions and valley portions.

* * * * *